No. 819,474. PATENTED MAY 1, 1906.
B. TULKA.
BICYCLE HANDLE BAR.
APPLICATION FILED JUNE 21, 1905.
2 SHEETS—SHEET 1.
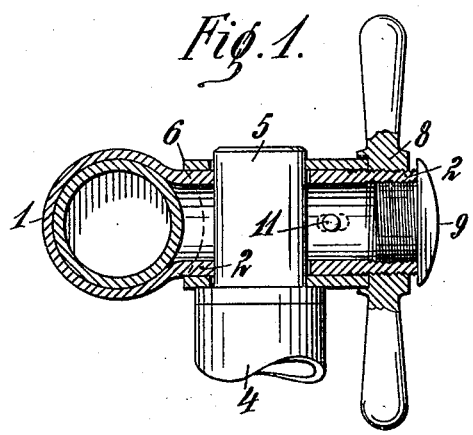
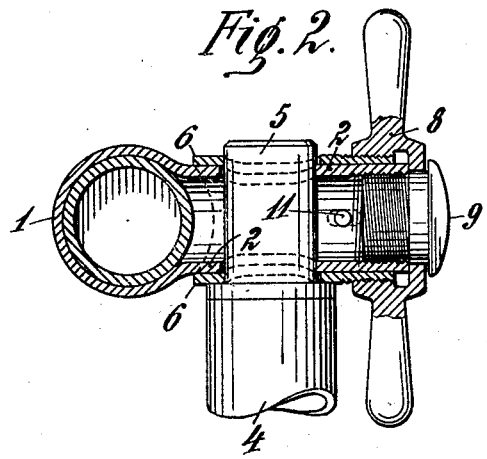

No. 819,474. PATENTED MAY 1, 1906.
B. TULKA.
BICYCLE HANDLE BAR.
APPLICATION FILED JUNE 21, 1905.
2 SHEETS—SHEET 2.
Fig. 3.
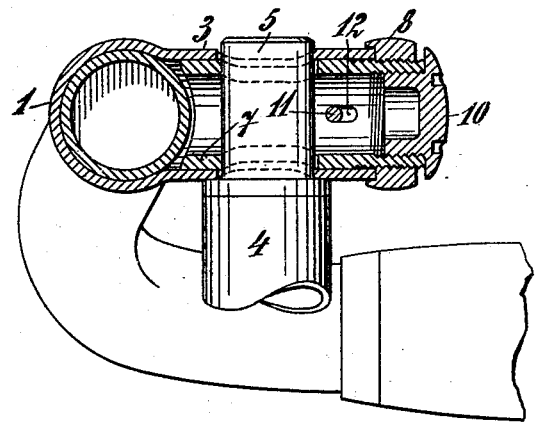
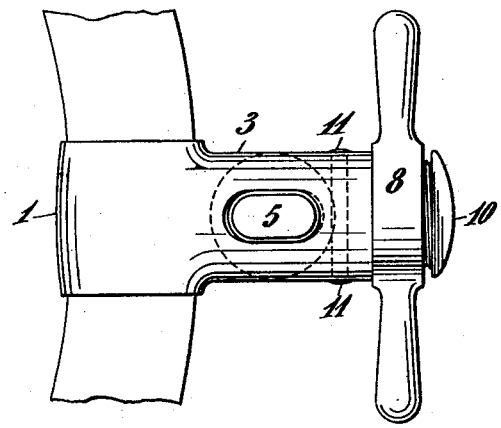
Fig. 4.

UNITED STATES PATENT OFFICE.

BOHUMIL TULKA, OF PRAGUE, AUSTRIA-HUNGARY.

BICYCLE HANDLE-BAR.

No. 819,474.　　　　Specification of Letters Patent.　　　Patented May 1, 1906.

Application filed June 21, 1905. Serial No. 266,247.

*To all whom it may concern:*

Be it known that I, BOHUMIL TULKA, a subject of the Emperor of Austria-Hungary, residing at Prague, in the Kingdom of Bohemia, Austria-Hungary, have invented certain new and useful Improvements in Bicycle Handle-Bars, of which the following is a specification.

My invention relates to handle-bars for bicycles; and it consists in certain improvements in handle-bars of the detachable type, whereby the mechanism is strengthened and the operation of attaching or detaching the handle-bars from the head or steering-spindle is greatly facilitated.

Referring to the accompanying drawings, Figure 1 is a view showing one form of the invention, certain parts appearing in section. Fig. 2 is a view like Fig. 1 and of a mechanism the same as that shown in Fig. 1, except for a sight detail. Fig. 3 is a view showing another form of the invention, certain parts appearing in section; and Fig. 4 is a plan view of what is shown in Fig. 3.

In the drawings, 4 is the head or steering-spindle of a bicycle or the like, and 5 is a reduced extension or stud surmounting said head and having a non-circular cross-section.

1 is the sleeve portion of a tubular part 2, Figs. 1 and 2, or 3, Figs. 3 and 4, said sleeve portion 1 being adapted to receive and carry the handle-bars and standing at right angles to the part 2 or 3.

Referring to Figs. 1 and 2, 6 is another tubular part arranged telescopically with reference to the tubular part 2 and outside of the same. The parts 6 and 2 have coinciding openings extending transversely through them, in which is received the stud 5 of the head 4. 8 is a nut which is screwed onto one of the parts 6 2. In Fig. 1 it is screwed onto part 6 and in Fig. 2 on the part 2, in each instance bearing against the adjoining end of the other part. 11 is a pin which may be carried by one of the parts 6 2 and work in a longitudinal slot in the other.

Referring to Figs. 3 and 4, 7 is a tubular part arranged telescopically and inside of the tubular part 3, whose portion 1 directly carries the handle-bars. Parts 3 and 7 are formed with coinciding transverse openings receiving the stud 11 of the head 4, the same as the corresponding parts in Figs. 1 and 2. 12 is the slot-and-pin arrangement for guiding these parts longitudinally on each other. 8 is a nut which is screwed onto part 7 and bears against the adjoining end of the part 3.

In all the figures it will be observed that manipulation of the nut will cause the parts 2 and 6 or 3 and 7 to move in opposite directions, the effect of which will be to make them bind on the stud 5 or release the same, according to the direction in which the nut is turned.

9, in Figs. 1 and 2, and 10, in Figs. 3 and 4, is simply a lock-nut to hold nut 8 where set.

Having thus fully described my invention, what I claim as new, and desire to secure by Letters Patent, is—

1. In a bicycle handle-bar, the combination of the head, two members arranged telescopically and having coinciding transverse openings receiving a portion of the head, and means for adjusting said members in opposite directions, whereby to cause them to be clamped securely to the head, substantially as described.

2. In a bicycle handle-bar, the combination of the head, two members arranged telescopically and having coinciding transverse openings receiving a portion of the head, and means for adjusting said members in opposite directions longitudinally, whereby to cause them to be clamped securely to the head, substantially as described.

3. In a bicycle handle-bar, the combination of the head, two members arranged telescopically and having coinciding transverse openings receiving a portion of the head, and means, directly carried by one and bearing against the other of said members, for adjusting said members in opposite directions longitudinally, whereby to cause them to be clamped securely to said head, substantially as described.

4. In a bicycle handle-bar, the combination of the head, two members arranged telescopically and having coinciding transverse openings receiving a portion of the head, and a nut, screwed onto one and bearing against the other of said members, for adjusting said members in opposite directions longitudinally, whereby to cause them to be clamped securely to said head, substantially as described.

In testimony whereof I affix my signature in presence of two witnesses.

BOHUMIL TULKA.

Witnesses:
 ADOLPH FISCHER,
 LADSLAR VOJACELY.